United States Patent
Kum et al.

(10) Patent No.: US 12,030,529 B2
(45) Date of Patent: Jul. 9, 2024

(54) ELECTRONIC DEVICE FOR INTEGRATING AND PREDICTING FUTURE TRAJECTORIES OF UNSPECIFIED NUMBER OF SURROUNDING VEHICLES AND OPERATING METHOD THEREOF

(71) Applicant: Korea Advanced Institute of Science and Technology, Yuseong-gu (KR)

(72) Inventors: Dongsuk Kum, Yuseong-gu (KR); Hyeong Seok Jeon, Yuseong-gu (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 370 days.

(21) Appl. No.: 17/035,377

(22) Filed: Sep. 28, 2020

(65) Prior Publication Data

US 2021/0261167 A1     Aug. 26, 2021

(30) Foreign Application Priority Data

Feb. 24, 2020    (KR) ........................ 10-2020-0022060

(51) Int. Cl.
| | |
|---|---|
| *B60W 60/00* | (2020.01) |
| *G06N 3/049* | (2023.01) |
| *G06N 3/08* | (2023.01) |
| *G06V 10/764* | (2022.01) |
| *G06V 10/82* | (2022.01) |

(Continued)

(52) U.S. Cl.
CPC ............... *B60W 60/00274* (2020.02); *B60W 60/00272* (2020.02); *G06N 3/049* (2013.01); *G06N 3/08* (2013.01); *G06V 10/764* (2022.01); *G06V 10/82* (2022.01); *G06V 20/56* (2022.01); *G06V 20/58* (2022.01); *B60W 2556/10* (2020.02); *B60W 2556/45* (2020.02)

(58) Field of Classification Search
None
See application file for complete search history.

(56) References Cited

U.S. PATENT DOCUMENTS 11,436,504 B1 *   9/2022   Lukarski .............. G05D 1/0246
11,507,830 B2 *   11/2022   Tawari ................. G06V 10/771

(Continued)

OTHER PUBLICATIONS

Park, Seong Hyeon, et al. "Sequence-to-sequence prediction of vehicle trajectory via LSTM encoder-decoder architecture." 2018 IEEE Intelligent Vehicles Symposium (IV). IEEE, 2018. (Year: 2018).*

(Continued)

*Primary Examiner* — James J Lee
*Assistant Examiner* — David Hatch
(74) *Attorney, Agent, or Firm* — Superior IP, PLLC; Dustin L. Call (57) ABSTRACT

An electronic device and an operating method thereof are for predicting future trajectories of an unspecified number of surrounding vehicles in an integrated way. The electronic device and operating method may be configured to recognize historical trajectories of one or more surrounding objects, predict future trajectories of the surrounding objects in an integrated way based on the recognized historical trajectories, and plan a driving trajectory of the electronic device based on the predicted future trajectories of the surrounding objects.

13 Claims, 10 Drawing Sheets

(51) Int. Cl.
*G06V 20/56* (2022.01)
*G06V 20/58* (2022.01)

(56) References Cited

U.S. PATENT DOCUMENTS

| | | | |
|---|---|---|---|
| 2016/0116916 A1* | 4/2016 | Pink | G01S 13/89 |
| | | | 701/23 |
| 2020/0159216 A1* | 5/2020 | Le | B60W 60/001 |
| 2021/0064040 A1* | 3/2021 | Yadmellat | G05D 1/0212 |

OTHER PUBLICATIONS

Kawai, Wataru, Yusuke Mukuta, and Tatsuya Harada. "Scalable generative models for graphs with graph attention mechanism." arXiv preprint arXiv:1906.01861 (2019). (Year: 2019).*

"Graphs Lecture 16 CS2110 Fall 2017" (Year: 2017).* https://cs.stackexchange.com/questions/61022/is-zero-allowed-as-an-edges-weight-in-a-weighted-graph (Year: 2016).*

* cited by examiner

ELECTRONIC DEVICE FOR INTEGRATING AND PREDICTING FUTURE TRAJECTORIES OF UNSPECIFIED NUMBER OF SURROUNDING VEHICLES AND OPERATING METHOD THEREOF

CROSS REFERENCE TO RELATED APPLICATION

This application claims priority under 35 U.S.C. § 119 to Korean Patent Application No. 10-2020-0022060 filed on Feb. 24, 2020, which is incorporated herein by reference in its entirety.

BACKGROUND OF THE INVENTION

1. Technical Field

Various embodiments relate to an electronic device for predicting future trajectories of an unspecified number of surrounding vehicles in an integrated way and an operating method thereof.

2. Description of the Related Art

Recently, an autonomous driving technology is advanced. The development of the autonomous driving technology in various driving situations, such as a highway, a downtown road, and a crossroad, is in progress. Accordingly, the development of a technology capable of handling an unspecified number of surrounding vehicles in each driving situation is becoming important. Accordingly, research for predicting the driving trajectory of a vehicle with respect to multiple surrounding vehicles is carried out. However, substantially, an autonomous vehicle encounters a changeable road environment, and traffic in each road environment is variably changed in real time. Accordingly, it is difficult to secure a consistent performance and computational load in predicting the driving trajectories of multiple vehicles with respect to traffic that varies in real time.

SUMMARY OF THE INVENTION

Various embodiments provide an electronic device capable of securing a consistent performance and computational load in predicting the driving trajectory of a vehicle based on traffic that varies in real time, and an operating method thereof.

Various embodiments provide an electronic device capable of predicting future trajectories of an unspecified number of surrounding vehicles in an integrated way and an operating method thereof.

According to various embodiments, an operating method of an electronic device may include recognizing trajectories of one or more surrounding objects, predicting future trajectories of the surrounding objects in an integrated way based on the recognized trajectories, and planning a driving trajectory of the electronic device based on the predicted future trajectories of the surrounding objects.

According to various embodiments, an electronic device may include at least one of a sensor module or a camera module and a processor coupled to at least one of the sensor module or the camera module and configured to collect information on surrounding situations through at least one of the sensor module or the camera module. The processor may be configured to recognize trajectories of one or more surrounding objects, predict future trajectories of the surrounding objects in an integrated way based on the trajectories, and plan a driving trajectory of the electronic device based on the predicted future trajectories of the surrounding objects.

DETAILED DESCRIPTION

Hereinafter, various embodiments of this document are described with reference to the accompanying drawings.

Figure 1:
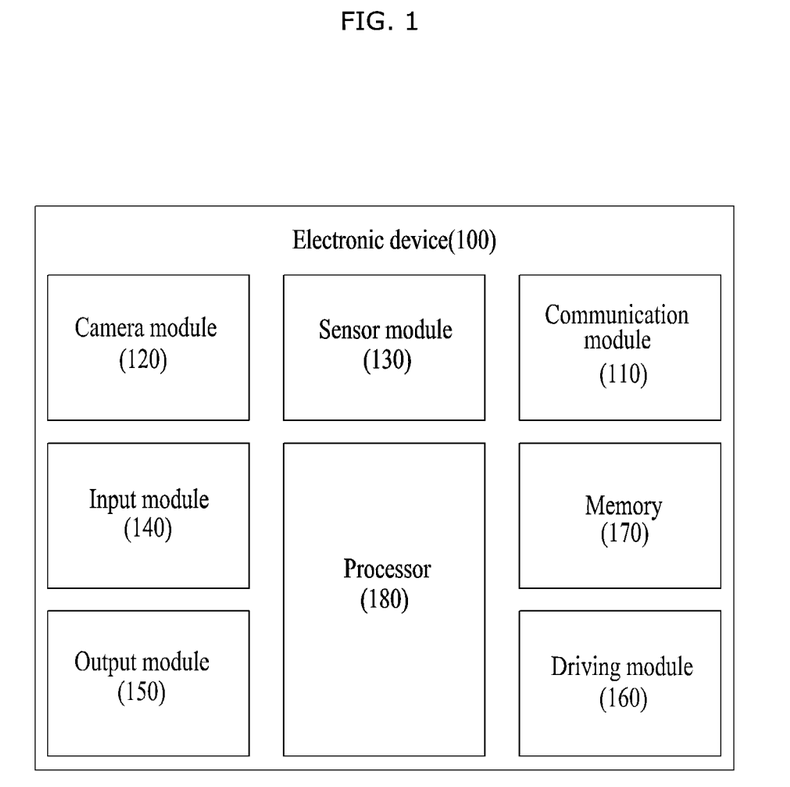
FIG. 1 is a diagram illustrating an electronic device according to various embodiments.
Figure 2:
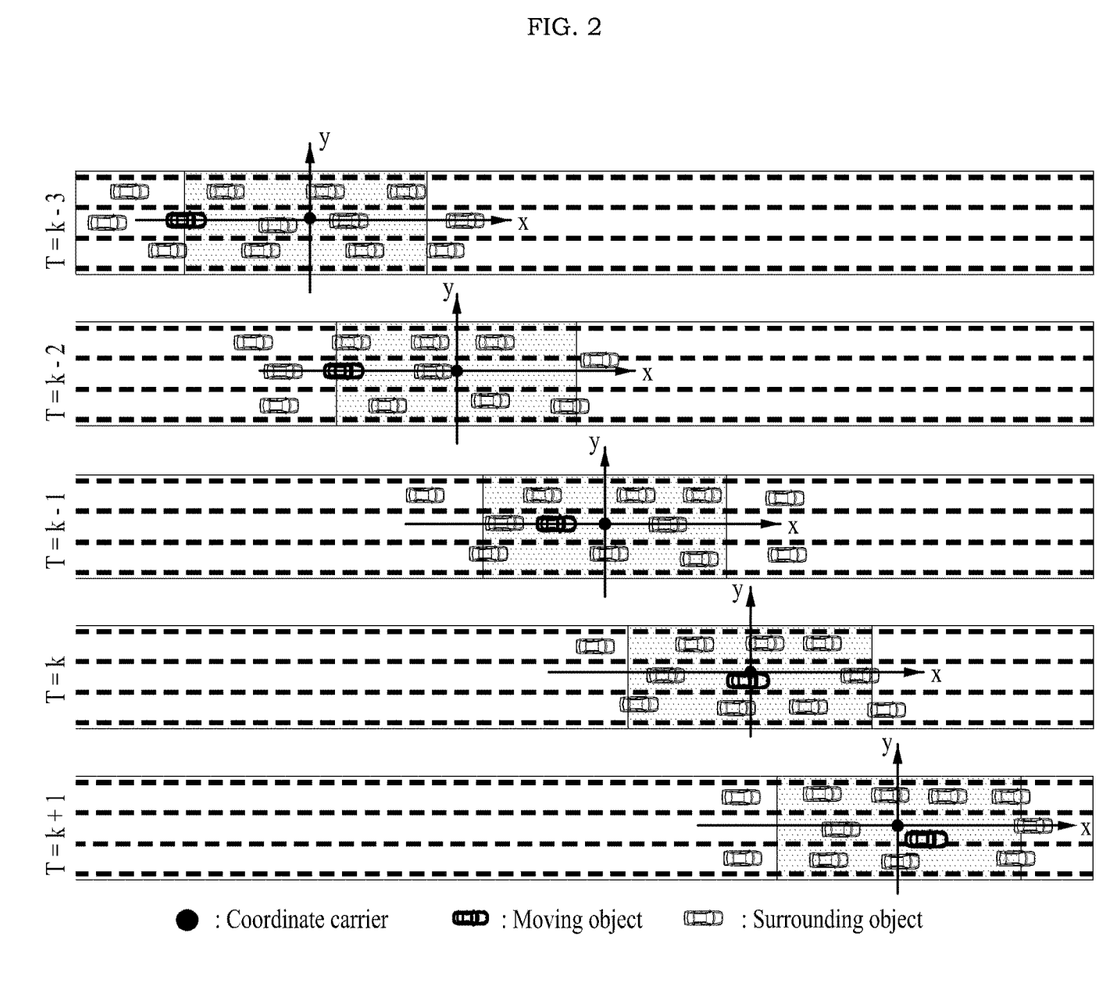
FIG. 2 is a diagram for describing operating characteristics of the electronic device according to various embodiments.
Figure 3:
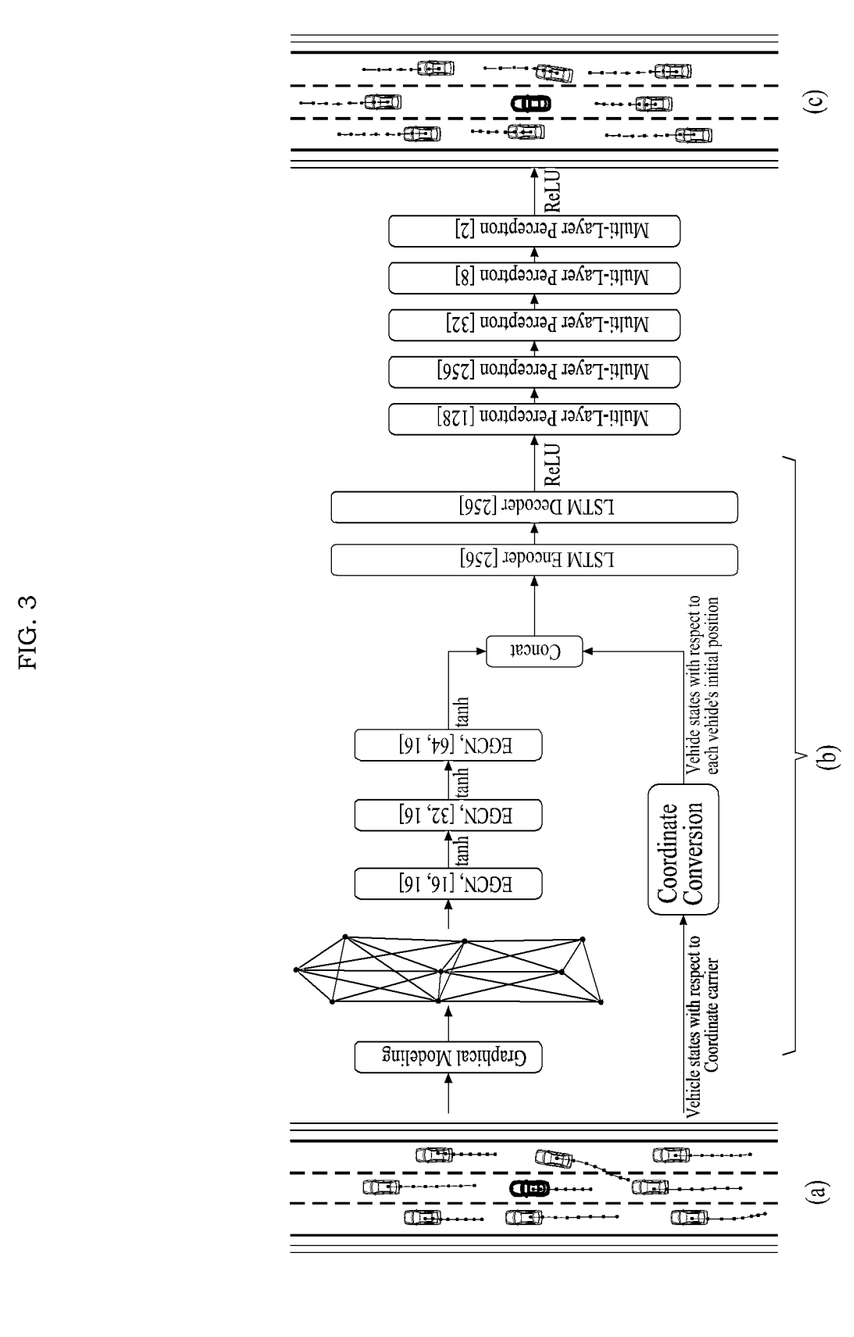
FIG. 3(a) is a diagram showing trajectories of surrounding objects.
FIG. 3(b) is a diagram showing a graph convolution neural network based on the trajectories shown in FIG. 3(a).
FIG. 3(c) is a diagram showing predicted future trajectories of surrounding objects.

FIG. 1 is a diagram illustrating an electronic device 100 according to various embodiments. FIGS. 2 and 3 are diagrams for describing operating characteristics of the electronic device 100 according to various embodiments.

Referring to FIG. 1, the electronic device 100 according to various embodiments may include at least any one of a communication module 110, a camera module 120, a sensor module 130, an input module 140, an output module 150, a driving module 160, a memory 170 or a processor 180. In an embodiment, any one of the elements of the electronic device 100 may be omitted or one or more other elements may be added to the electronic device 100. According to one embodiment, the electronic device 100 may be an autonomous vehicle. According to another embodiment, the electronic device 100 may be mounted on a vehicle and may implement an autonomous vehicle.

The communication module 110 may support communication between the electronic device 100 and an external device (not illustrated). In this case, the communication module 110 may include at least any one of a wireless communication module or a wired communication module.

According to one embodiment, the wireless communication module may support at least any one of a long-distance communication method or a short-distance communication method. The short-distance communication method may include at least any one of Bluetooth, WiFi direct, or infrared data association (IrDA), for example. In the wireless communication method, communication may be performed using the long-distance communication method over a network. The network may include at least any one of computer networks, such as a cellular network, the Internet, a local area network (LAN) or a wide area network (WAN). According to another embodiment, the wireless communication module may support communication with a global navigation satellite system (GNSS). For example, the GNSS may include a global positioning system (GPS).

The camera module 120 may capture an external image of the electronic device 100. In this case, the camera module 120 may be installed at a predetermined location of the electronic device 100, and may capture an external image. Furthermore, the camera module 120 may generate image data for an external image of the electronic device 100. For example, the camera module 120 may include at least any one of a lens, at least one image sensor, an image signal processor or a flash.

The sensor module 130 may detect a state of the electronic device 100 or an external environment of the electronic device 100. Furthermore, the sensor module 130 may generate sensing data for the state of the electronic device 100 or the external environment of the electronic device 100. For example, the sensor module 130 may include at least any one of an acceleration sensor, a gyroscope sensor, an image sensor, a RADAR sensor, a LiDAR sensor or an ultrasonic sensor.

The input module 140 may receive, from the outside of the electronic device 100, a command or data to be used for at least any one of the elements of the electronic device 100. For example, the input module 140 may include at least any one of a microphone, a mouse or a keyboard. In an embodiment, the input module may include at least any one of a touch circuitry configured to detect a touch or a sensor circuitry configured to measure the intensity of a force generated by a touch.

The output module 150 may provide information to the outside of the electronic device 100. In this case, the output module 150 may include at least any one of a display module or an audio module. The display module may visually output information. For example, the display module may include at least any one of a display, a hologram device, or a projector. In an embodiment, the display module may be assembled with at least any one of the touch circuitry or sensor circuitry of the input module 140, and may be implemented as a touch screen. The audio module may output information in a sound form. For example, the audio module may include at least any one of a speaker or a receiver.

The driving module 160 may operate for an operation of the electronic device 100. According to one embodiment, if the electronic device 100 is an autonomous vehicle, the driving module 160 may include various parts. According to another embodiment, if the electronic device 100 is mounted on a vehicle to implement an autonomous vehicle, the driving module 160 may be connected to various parts of the vehicle. Accordingly, the driving module 160 may operate while controlling at least any one of the parts. For example, the parts may include at least any one of an engine module, an acceleration module, a braking module, a steering module or a navigation module.

The memory 170 may store at least any one of a program or data used by at least any one of the elements of the electronic device 100. For example, the memory 170 may include at least any one of a volatile memory or a non-volatile memory.

The processor 180 may control at least any one of the elements of the electronic device 100 by executing a program of the memory 170, and may perform a data processing or operation. The processor 180 may collect information on surrounding situations of the electronic device 100. In this case, the processor 180 may collect the information on the surrounding situations of the electronic device 100 based on at least any one of image data obtained through the camera module 120 or sensing data obtained through the sensor module 130. The processor 180 may predict the future trajectory of the surrounding objects for planning driving trajectory of the electronic device 100 based on a surrounding situation of the electronic device 100. Accordingly, the processor 180 may control an operation of the electronic device 100 based on the planned driving trajectory of the electronic device 100. To this end, the processor 180 may control the driving module 160 based on the planned driving trajectory of the electronic device 100.

The processor 180 may recognize the historical trajectories of surrounding objects based on information on surrounding situations of the electronic device 100. In this case, the surrounding objects may be vehicles around the electronic device 100. For example, all the surrounding objects may be traveling at respective speeds, and at least any one of the surrounding objects may be stopped. In this case, the processor 180 may recognize state information on the electronic device 100, and may detect state information on each of the surrounding objects. Furthermore, as illustrated in FIG. 2, the processor 180 may configure a moving coordinate system based on a constant velocity model using state information on the electronic device 100, and may represent relative positions of surrounding objects on the moving coordinate system. In FIG. 2, the electronic device 100 may be represented as a moving object. In this case, the coordinate carrier of the moving coordinate system may move in accordance with the speed of the electronic device 100. Accordingly, the processor 180 may recognize historical trajectories of the surrounding objects based on the positions of the surrounding objects on the moving coordinate system.

As illustrated in FIG. 3, the processor 180 may predict future trajectories of surrounding objects in an integrated way based on the recognized historical trajectories of the surrounding objects. In this case, the processor 180 may predict the future trajectories by integrating and estimating interactions between the surrounding objects and the electronic device 100, and. In this case, the processor 180 may estimate the interactions in an integrated way based on characteristics of the interactions. For example, the characteristics of the interactions may have simultaneous multicentricity, diffusivity and time variability. The simultaneous multicentricity may indicate that multiple interactions occur at the same time. The diffusivity may indicate that an interaction between the electronic device 100 and any one of the surrounding objects or between any two of the surrounding objects may be gradually diffused to affect all of the electronic device 100 and the surrounding objects. The time variability may indicate that an interaction is changed over time. To this end, the processor 180 may configure a graph model for a surrounding situation of the electronic device 100 by performing graph modeling, as illustrated in FIG. 3(b), based on trajectories of the surrounding objects, such as those illustrated in FIG. 3(a). Furthermore, the processor 180 may configure a graph convolution neural network based on the graph model as illustrated in FIG. 3(b), and may predict future trajectories of the surrounding objects, such as those illustrated in FIG. 3(c), from the graph model and the graph convolution neural network based on a long short-term memory network (LSTM). Accordingly, the processor 180 may plan the driving trajectory of the electronic device 100 based on the predicted future trajectories of the surrounding objects.

Figure 4:
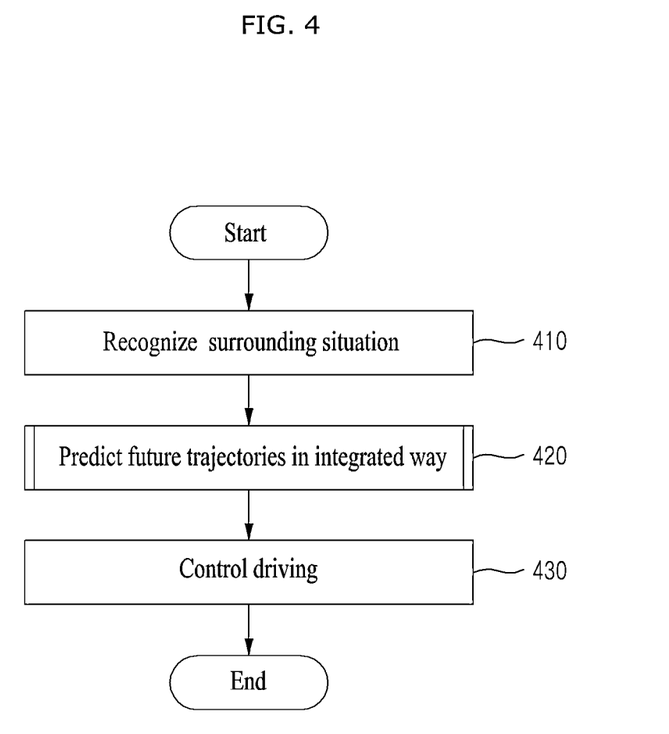
FIG. 4 is a diagram illustrating an operating method of the electronic device according to various embodiments.

FIG. 4 is a diagram illustrating an operating method of the electronic device 100 according to various embodiments.

Referring to FIG. 4, at operation 410, the electronic device 100 may recognize a surrounding situation of the electronic device 100. The processor 180 may obtain image data through the camera module 120. The processor 180 may obtain sensing data through the sensor module 130. Accordingly, the processor 180 may collect information on the surrounding situation of the electronic device 100 based on at least any one of the image data or the sensing data.

In this case, the processor 180 may recognize state information on the electronic device 100. In this case, surrounding objects may be vehicles around the electronic device 100. For example, all of the surrounding objects may be traveling at respective speed, and at least any one of the surrounding objects may be stopped. Furthermore, as illustrated in FIG. 2, the processor 180 may configure a moving coordinate system based on a constant velocity model using the state information on the electronic device 100. In FIG. 2, the electronic device 100 may be represented as a moving object. In this case, the coordinate carrier of the moving coordinate system may move in accordance with the speed of the electronic device 100. Furthermore, the processor 180 may detect state information on each of the surrounding objects based on the information on the surrounding situation of the electronic device 100.

At operation 420, the electronic device 100 may predict future trajectories of the electronic device 100 and the surrounding objects in an integrated way. In this case, the processor 180 may represent relative positions of the surrounding objects on the moving coordinate system based on a constant velocity model, as illustrated in FIG. 2, based on the state information on the surrounding objects. Accordingly, the processor 180 may recognize historical trajectories of the surrounding objects based on the positions of the surrounding objects on the moving coordinate system based on a constant velocity model. Furthermore, the processor 180 may predict future trajectories of the electronic device 100 and the surrounding objects in an integrated way based on the trajectories of the surrounding objects. In this case, the processor 180 may estimate interactions between the surrounding objects and the electronic device 100 in an integrated way, and may predict the future trajectories based on the interactions. In this case, the processor 180 may estimate the interactions in an integrated way based on characteristics of the interactions. For example, the characteristics of the interactions may have simultaneous multicentricity, diffusivity and time variability. The simultaneous multicentricity may indicate that multiple interactions occur at the same time. The diffusivity may indicate that an interaction between the electronic device 100 and any one of the surrounding objects or between any two of the surrounding objects may be gradually diffused to affect all of the electronic device 100 and the surrounding objects. The time variability may indicate that an interaction is changed over time. This may be more specifically described later with reference to FIGS. 5 and 6.

Figure 5:
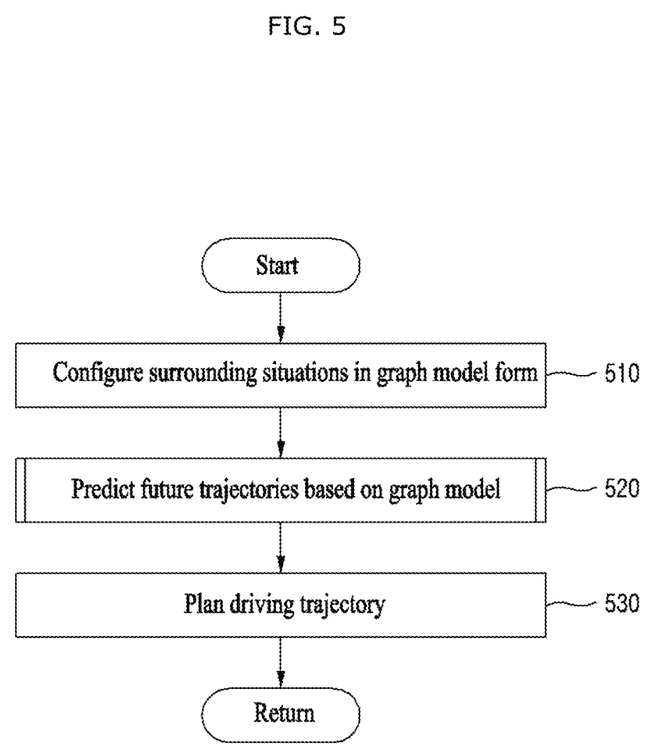
FIG. 5 is a diagram illustrating an operation of integrating and predicting future trajectories in FIG. 4.
Figure 6:
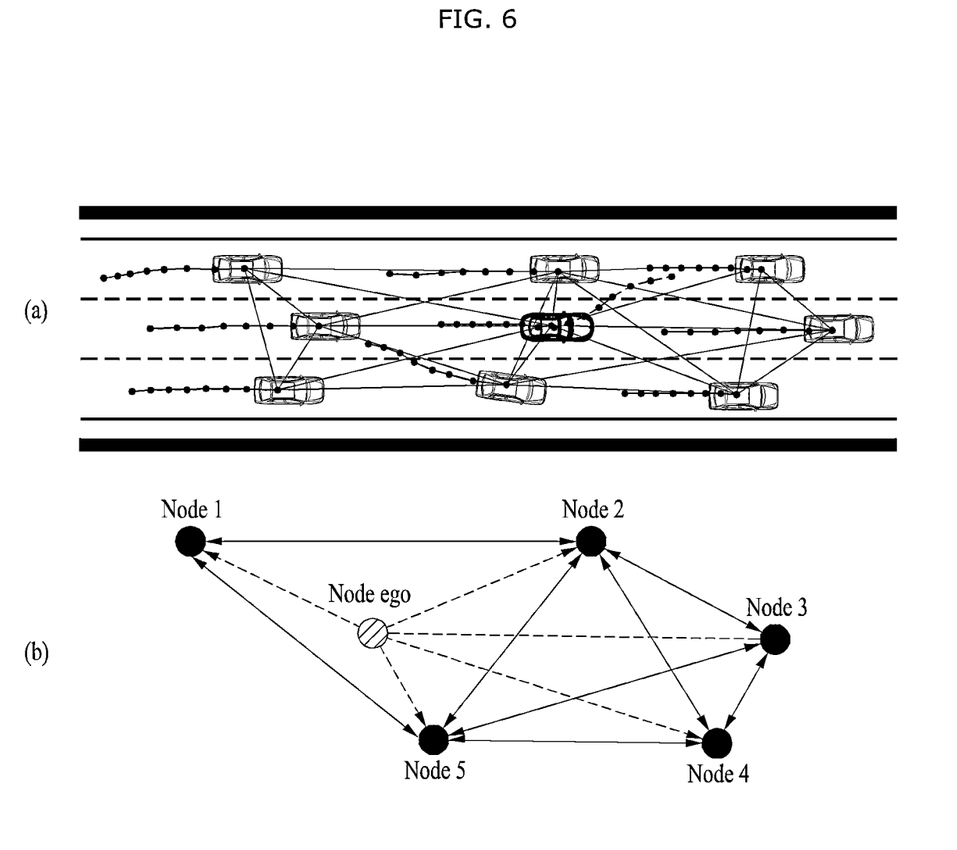
FIG. 6(a) is a diagram for describing an operation of configuring a graph model illustrated in FIG. 5.
FIG. 6(b) is a diagram of a graph model.

FIG. 5 is a diagram illustrating the integrated operation of predicting the future trajectories in FIG. 4. FIG. 6 is a diagram for describing an operation of configuring a graph model illustrated in FIG. 5.

Referring to FIG. 5, at operation 510, the electronic device 100 may configure a surrounding situation of the electronic device 100 as a graph model. The processor 180 may configure the graph model for the surrounding situation of the electronic device 100 by performing graph modeling based on state information on the electronic device 100 and the surrounding objects. In this case, the processor 180 may configure the graph model using a moving coordinate system based on a constant velocity model. For example, as illustrated in FIG. 6(a), the processor 180 may configure, as the graph model, the electronic device 100 and the surrounding objects and interactions between the electronic device 100 and the surrounding objects.

For example, the graph model may be represented as illustrated in FIG. 6(b), and may include a plurality of nodes and a plurality of edges that connect the plurality of nodes. The nodes may indicate the electronic device 100 and surrounding objects, respectively. In this case, the nodes may represent at least any one of a position, speed or a heading angle, for example, based on state information on the electronic device 100 or the surrounding objects. In FIG. 6(b), the nodes include a first node (e.g., Node ego; Node 0) and second nodes (e.g., Node 1, Node 2, Node 3, Node 4, and Node 5). The first node (e.g., Node ego; Node 0) may indicate the electronic device 100. The second nodes (e.g., Node 1, Node 2, Node 3, Node 4, and Node 5) may indicate the surrounding objects, respectively. The edges may indicate the directionality of interactions between the electronic device 100 and the surrounding objects, respectively. The edges may represent at least any one of a relative location or a relative speed, for example, based on relative state information on the electronic device 100 or the surrounding objects. In this case, an edge that connects the first node (e.g., Node ego; Node 0) and any one of the second nodes (e.g., Node 1, Node 2, Node 3, Node 4, and Node 5) may contain uni-directionality from the first node (e.g., Node ego; Node 0) to any one of the second nodes (e.g., Node 1, Node 2, Node 3, Node 4, and Node 5). The reason for this is that the electronic device 100 may be autonomously controlled. An edge that connects any two of the second nodes (e.g., Node 1, Node 2, Node 3, Node 4, and Node 5) may contain bi-directionality.

At operation 520, the electronic device 100 may predict future trajectories of the electronic device 100 and the surrounding objects in an integrated way based on the graph model. The processor 180 may predict the future trajectories of the electronic device 100 and the surrounding objects based on the interactions between the surrounding objects and the electronic device 100. In this case, the processor 180 may configure a graph convolution neural network based on the graph model, and may predict the future trajectories from the graph convolution neural network based on a long short-term memory network (LSTM). This may be more specifically described later with reference to FIGS. 7, 8 and 9.

Figure 7:
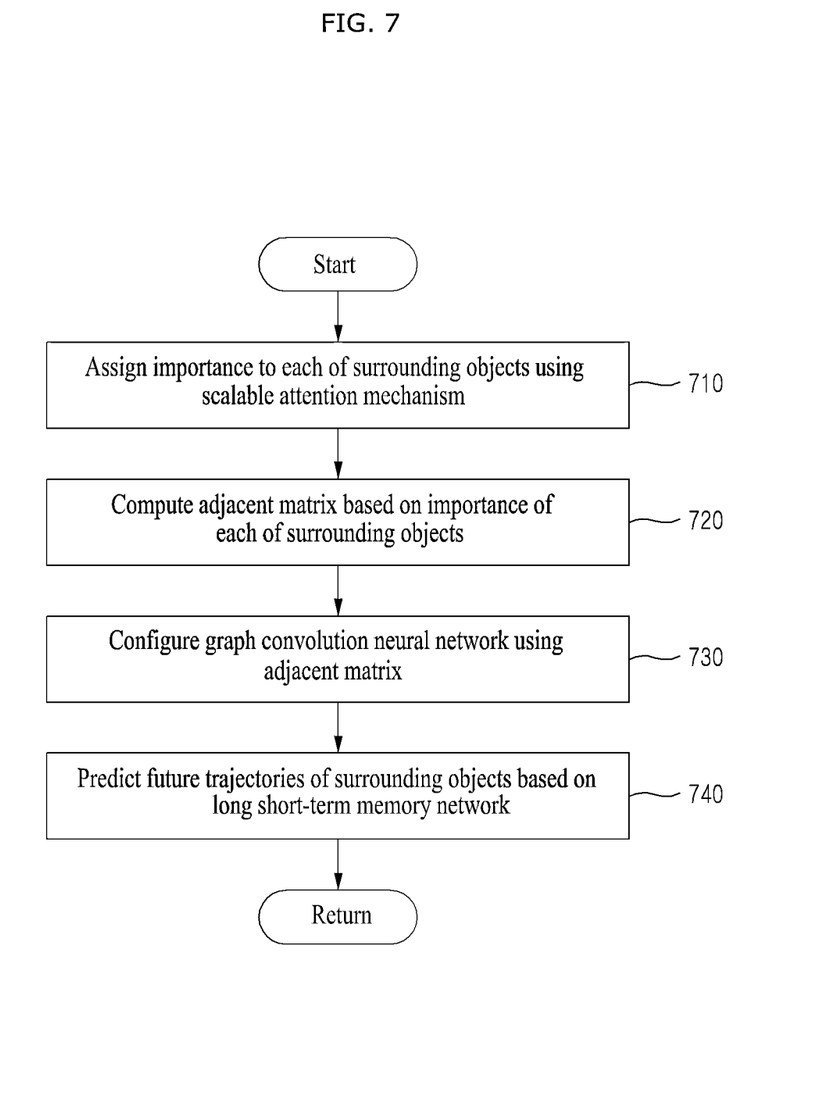
FIG. 7 is a diagram illustrating an operation of predicting future trajectories based on a graph model in FIG. 5.
Figure 8:
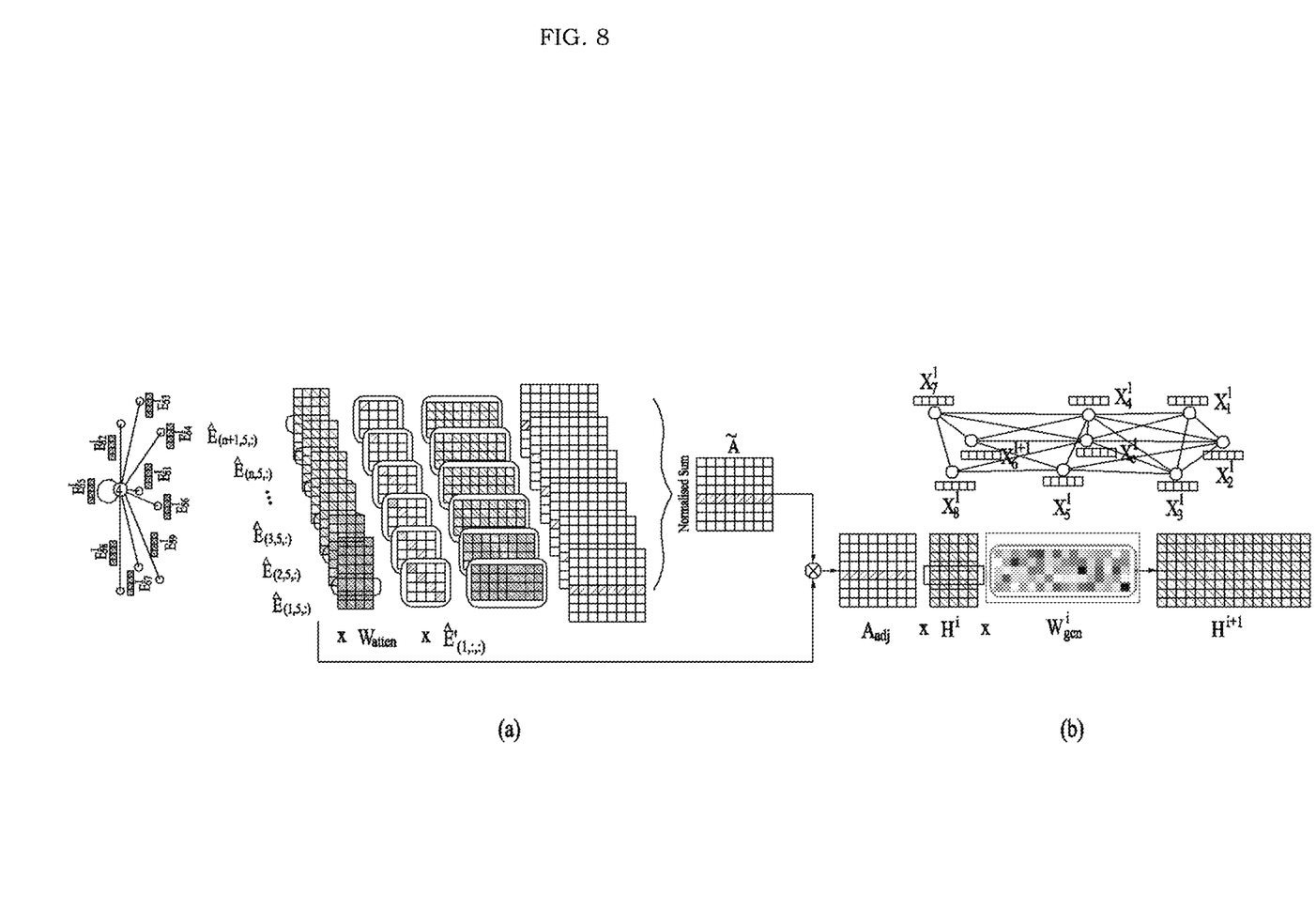
FIG. 8(a) is a diagram illustrating a scalable attention mechanism.
FIG. 8(b) is a diagram showing a graph convolution neural network based on the operation shown in the graph model of FIG. 5.
Figure 9:
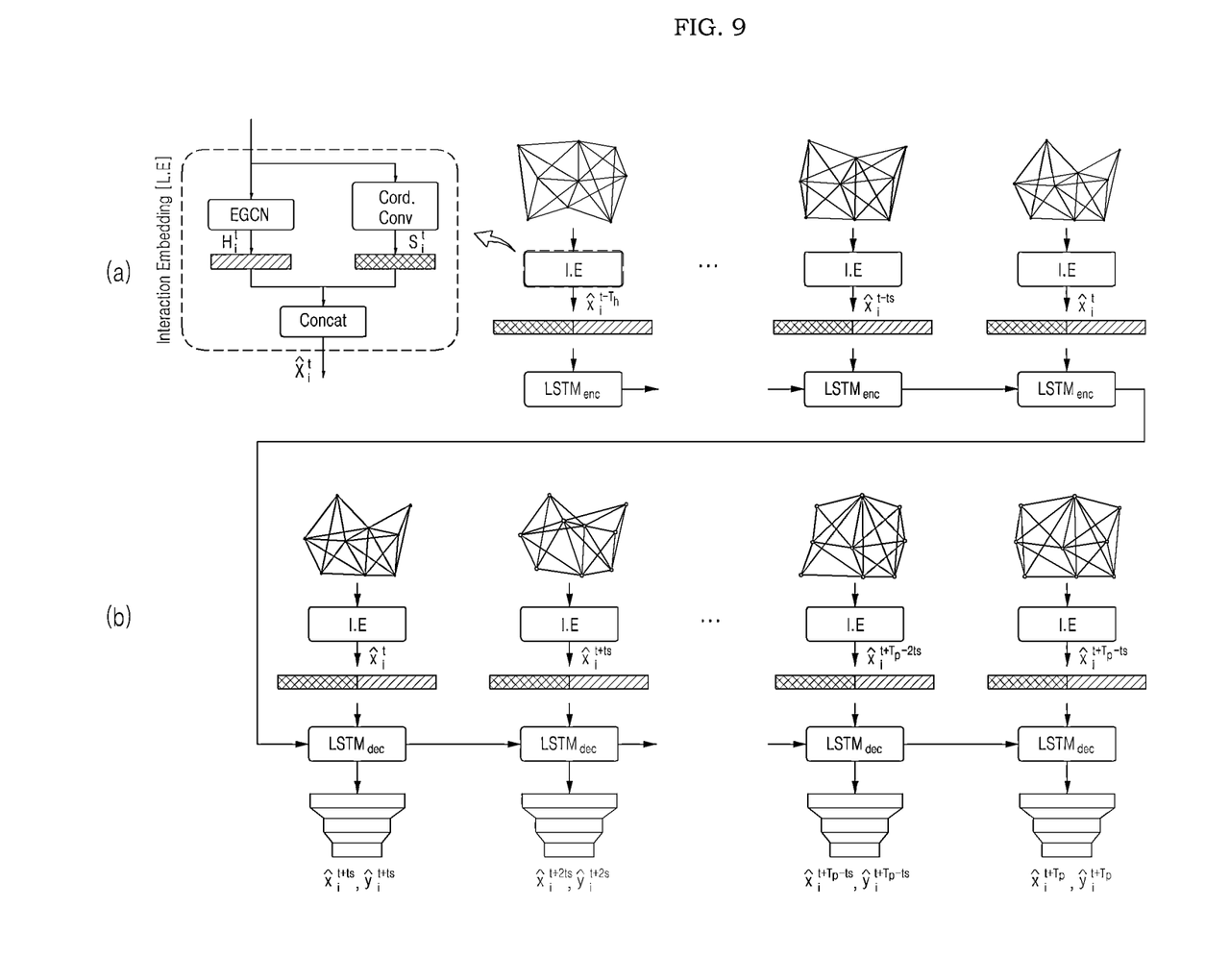
FIG. 9(a) is a diagram showing a recognition of a motion characteristic of each of the electronic device and the surrounding objects.
FIG. 9(b) is a diagram showing a projection of future trajectories.

FIG. 7 is a diagram illustrating the operation of predicting the future trajectories based on the graph model in FIG. 5. FIGS. 8 and 9 are diagrams for describing the operation of predicting the future trajectories based on the graph model in FIG. 5.

Referring to FIG. 7, at operation 710, the electronic device 100 may assign importance to each of the surrounding objects using a scalable attention mechanism. The scalable attention mechanism may be configured as illustrated in FIG. 8(a). The electronic device 100 may process unspecified number of multiple surrounding objects that vary in real time in an integrated way through the scalable attention mechanism. In this case, the processor 180 may relatively evaluate two nodes connected by each edge in the graph model based on state information on the electronic device 100 and the surrounding objects. Furthermore, the processor 180 may assign importance to each of the nodes based on the results of the evaluation.

At operation 720, the electronic device 100 may compute an adjacency matrix based on the importance of each of the surrounding objects. The processor 180 may compute an adjacency matrix to which the importance of each of the surrounding objects has been considered.

At operation 730, the electronic device 100 may configure a graph convolution neural network using the adjacency matrix. The processor 180 may configure the graph convolution neural network based on the graph model and the adjacency matrix. In this case, as illustrated in FIG. 8(b), the processor 180 may configure the graph convolution neural network by performing a graph convolution operation.

At operation 740, the electronic device 100 may predict the future trajectories of the surrounding objects based on the long short-term memory network LSTM. The processor 180 may predict the future trajectories from the graph model and the graph convolution neural network based on the LSTM. In this case, the LSTM may be configured with an encoding structure and a decoding structure. As illustrated in FIG. 9(a), the processor 180 may recognize a motion characteristic of each of the electronic device 100 and the surrounding objects and interaction characteristics between the electronic device 100 and the surrounding objects based on the state information on the electronic device 100 and the surrounding objects through the encoding structure of the LSTM. Furthermore, the processor 180 may plan hidden state information and memory cell state information based on the motion characteristic varying over time and the interaction characteristic through the encoding structure of the LSTM. Furthermore, as illustrated in FIG. 9(b), the processor 180 may predict the future trajectories based on the state information on the electronic device 100 and the surrounding objects along with the hidden state information and the memory cell state information through the decoding structure of the LSTM.

Thereafter, the electronic device 100 may return to FIG. 5 and may perform operation 530. Referring back to FIG. 5, at operation 530, the electronic device 100 may plan the driving trajectory of the electronic device 100 based on the predicted future trajectories of the surrounding objects. The processor 180 may plan an optimal driving trajectory which may correspond to the predicted future trajectories of the surrounding objects.

Thereafter, the electronic device 100 may return to FIG. 4 and perform operation 430. Referring back to FIG. 4, at operation 430, the electronic device 100 may control the electronic device 100. The processor 180 may control the driving module 160 based on the driving trajectory of the electronic device 100. In this case, the driving module 160 may operate while controlling at least any one of various parts. For example, the various parts may include at least any one of an engine module, an acceleration module, a braking module, a steering module or a navigation module. Accordingly, an autonomous vehicle corresponding to the electronic device 100 or a vehicle including the electronic device 100 may travel along the driving trajectory.

According to various embodiments, the electronic device 100 may predict future trajectories of an unspecified number of surrounding objects in an integrated way based on the historical trajectories of the surrounding objects. In this case, the electronic device 100 may configure a graph model in relation to the surrounding objects, and may predict the future trajectories in an integrated way based on the graph model and the LSTM. Accordingly, the electronic device 100 may predict the future trajectories of the unspecified number of surrounding objects in an integrated way. Accordingly, the electronic device 100 may predict the future trajectory of a vehicle in accordance with traffic that varies in real time. That is, the electronic device 100 may plan the driving trajectory of the electronic device 100 based on the historical trajectory and predicted future trajectories of the objects including electronic device 100 and the surrounding objects. Furthermore, since the electronic device 100 plans the driving trajectory based on future trajectories predicted in an integrated way, the electronic device 100 can secure consistent performance and a computational load in predicting the driving trajectory.

Figure 10:
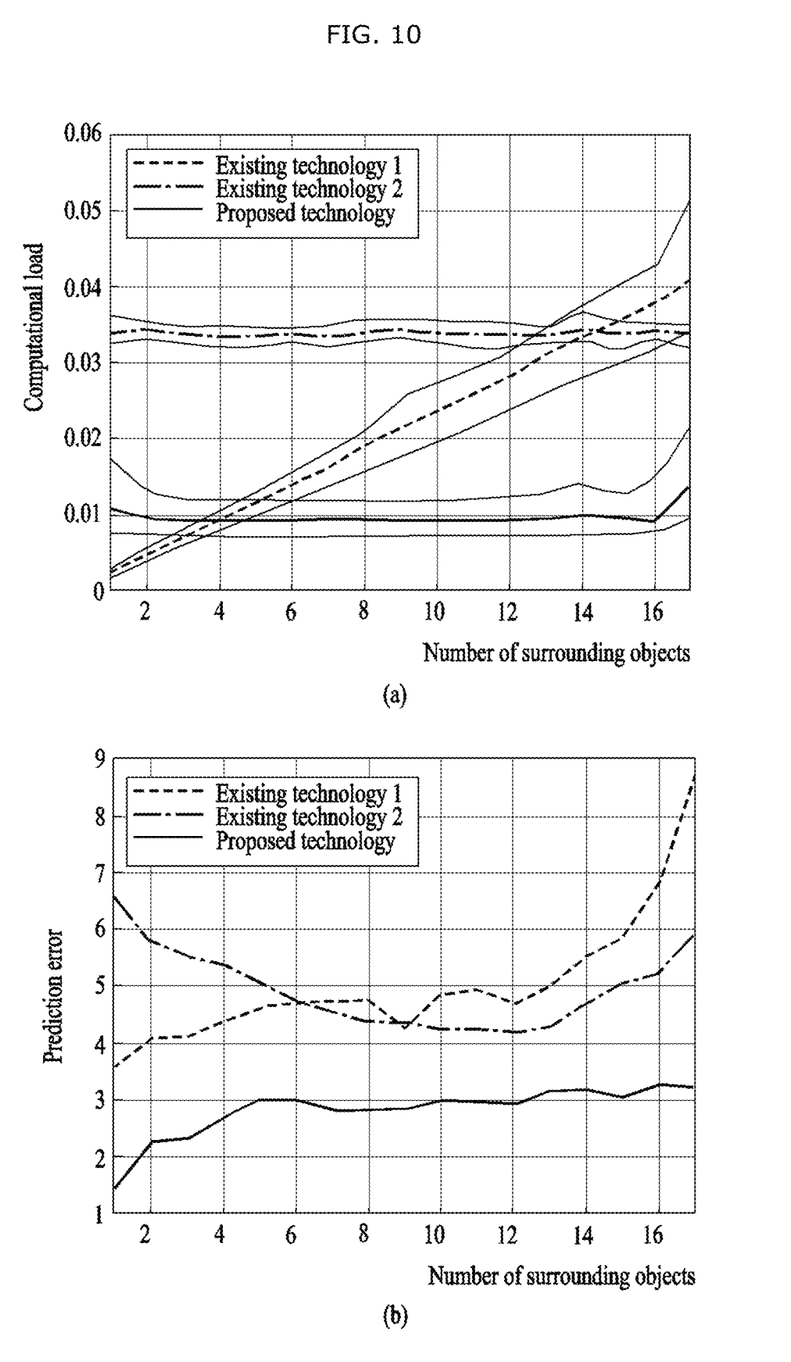
FIG. 10(a) is a diagram for describing operating effects of the electronic device according to various embodiments.
FIG. 10(b) is a diagram for describing prediction error of the electronic device according to various embodiments.

FIG. 10 is a diagram for describing operating effects of the electronic device 100 according to various embodiments. As illustrated in FIG. 10(a), a computational load according to various embodiments smaller than a computational load according to the existing technologies and is also consistent regardless of the number of surrounding objects. Furthermore, as illustrated in FIG. 10(b), a prediction error according to various embodiments is smaller than a prediction error according to the existing technologies and is also consistent regardless of the number of surrounding objects. Accordingly, performance according to various embodiments is more excellent than performance of the existing technologies and is also consistent regardless of the number of surrounding objects.

An operating method of the electronic device 100 according to various embodiments may include recognizing historical trajectories of one or more surrounding objects, predicting future trajectories of the surrounding objects in an integrated way based on the recognized historical trajectories, and planning the driving trajectory of the electronic device 100 based on the predicted future trajectories of the surrounding objects.

According to various embodiments, the predicting of the future trajectories may include configuring a graph model based on the recognized historical trajectories and predicting the future trajectories based on the graph model.

According to various embodiments, the graph model includes a plurality of nodes and a plurality of edges that connect the plurality of nodes.

According to various embodiments, the nodes may indicate the surrounding objects and the electronic device 100, respectively.

According to various embodiments, the edges may indicate interactions among the surrounding objects and between the electronic device 100 and each of the surrounding objects, and the directivities thereof, respectively.

According to various embodiments, edges that connect nodes indicating the surrounding objects may contain bi-directionality.

According to various embodiments, an edge that connects any one of the nodes indicating the surrounding objects and a node indicating the electronic device 100 may contain uni-directionality directed from the electronic device 100 toward the surrounding object.

According to various embodiments, the predicting of the future trajectories may further include relatively evaluating two nodes, connected by an edge, based on state information on the electronic device 100 and state information on each of the surrounding objects, wherein the two nodes are the electronic device 100 and one of the surrounding objects, or two of the surrounding objects, and assigning importance to each of the nodes and configuring a graph convolution neural network using an adjacency matrix to which the importance has been considered.

According to various embodiments, the predicting of the future trajectories may further include predicting the future trajectories from the graph convolution neural network based on the LSTM.

According to various embodiments, the recognizing of the trajectories may include configuring a moving coordinate system based on a constant velocity model using the state information on the electronic device 100, representing relative positions of the surrounding objects on the moving coordinate system, and recognizing the historical trajectories based on the time-serial positions.

According to various embodiments, the predicting of the future trajectories may include predicting the future trajectories on the moving coordinate system.

According to various embodiments, the operating method of the electronic device 100 may further include controlling the electronic device 100 based on the planned driving trajectory.

According to various embodiments, the electronic device 100 may be an autonomous vehicle, and surrounding objects may be vehicles around the electronic device 100.

The electronic device 100 according to various embodiments may include at least any one of the sensor module 130 or the camera module 120, and the processor 180 connected to at least any one of the sensor module 130 or the camera module 120 and configured to collect information on surrounding situations through at least any one of the sensor module 130 or the camera module 120.

According to various embodiments, the processor 180 may be configured to recognize historical trajectories of one or more surrounding objects, predict future trajectories of the surrounding objects in an integrated way based on the recognized historical trajectories, and plan the driving trajectory of the electronic device 100 based on the predicted future trajectories of the surrounding objects.

According to various embodiments, the processor 180 may be configured to configure a graph model based on the recognized historical trajectories and to predict the future trajectories based on the graph model.

According to various embodiments, the graph model may include a plurality of nodes and a plurality of edges that connect the plurality of nodes.

According to various embodiments, the nodes may indicate the surrounding objects and the electronic device 100, respectively.

According to various embodiments, the edges may indicate interactions among the surrounding objects and between the electronic device 100 and each of the surrounding objects, and directivities thereof, respectively.

According to various embodiments, edges that connect nodes indicating the surrounding objects may contain bi-directionality.

According to various embodiments, an edge that connects any one of the nodes indicating the surrounding objects and a node indicating the electronic device 100 may contain uni-directionality directed from the electronic device 100 toward the surrounding object.

According to various embodiments, the processor 180 may be configured to relatively evaluate two nodes connected by an edge based on state information on the electronic device 100 and state information on each of the surrounding objects, wherein the two nodes are the electronic device 100 and one of the surrounding objects, or two of the surrounding objects, assign importance to each of the nodes, and configure a graph convolution neural network using an adjacency matrix to which importance has been considered.

According to various embodiments, the processor 180 may be configured to predict the future trajectories from the graph convolution neural network based on the LSTM.

According to various embodiments, the processor 180 may be configured to configure a moving coordinate system based on a constant velocity model using the state information on the electronic device 100, represent relative positions of the surrounding objects on the moving coordinate system, and recognize the historical trajectories based on the time-serial positions.

According to various embodiments, the processor 180 may be configured to predict the future trajectories on the moving coordinate system.

According to various embodiments, the processor 180 may be configured to control the electronic device 100 based on the planned driving trajectory.

According to various embodiments, the electronic device 100 may be an autonomous vehicle, and the surrounding objects may be vehicles around the electronic device 100.

Various embodiments of this document may be implemented as software including one or more instructions stored in a storage medium (e.g., the memory 170) readable by a machine (e.g., the electronic device 100). For example, the processor (e.g., processor 180) of the machine may invoke at least one of the one or more instructions stored in the storage medium, and may execute the instruction. This enables the machine to operate to perform at least one function based on the invoked at least one instruction. The one or more instructions may include a code generated by a compiler or a code executable by an interpreter. The storage medium readable by the machine may be provided in the form of a non-transitory storage medium. In this case, the term "non-transitory" merely means that the storage medium is a tangible device and does not include a signal (e.g., electromagnetic wave). The term does not distinguish between a case where data is semi-permanently stored in the storage medium and a case where data is temporally stored in the storage medium.

The non-transitory computer-readable storage medium according to various embodiments may store one or more programs to execute recognizing the historical trajectories of one or more surrounding objects, predicting future trajectories of the surrounding objects in an integrated way based on the trajectories, and planning the driving trajectory of the electronic device 100 based on the predicted future trajectories of the surrounding objects.

The embodiments of this document and the terms used in the embodiments are not intended to limit the technology described in this document to a specific embodiment, but should be construed as including various changes, equivalents and/or alternatives of a corresponding embodiment. In the description of the drawings, similar reference numerals may be used in similar elements. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" and "the second", may modify corresponding elements regardless of their sequence or importance, and are used to only distinguish one element from the other element and do not limit corresponding elements. When it is described that one (e.g., first) element is "(functionally or communicatively) connected to" or "coupled with" the other (e.g., second) element, the one element may be directly connected to the other element or may be connected to the other element through another element (e.g., third element).

The "module" used in this document includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

According to various embodiments, each (e.g., module or program) of the described elements may include a single entity or a plurality of entities. According to various embodiments, one or more of the aforementioned elements or operations may be omitted or one or more other elements or operations may be added. Alternatively or additionally, a plurality of elements (e.g., modules or programs) may be integrated into one element. In such a case, the integrated elements may perform one or more functions of each of a plurality of elements identically with or similar to that performed by a corresponding one of the plurality of elements before the elements are integrated. According to various embodiments, other elements performed by a module, an operation or another program may be executed sequentially, in parallel, repeatedly or heuristically, or one or more of the operations may be executed in different order or may be omitted, or one or more other operations may be added.

According to various embodiments, the electronic device can predict future trajectories of surrounding objects in an integrated way based on trajectories of the surrounding objects. In this case, the electronic device can predict future trajectories of an unspecified number of surrounding objects in an integrated way. Accordingly, the electronic device can predict the driving trajectory of a vehicle based on traffic that varies in real time. Furthermore, the electronic device can secure a uniform performance and computational load in predicting various situations occurring during traveling and the driving trajectories of an unspecified number of surrounding objects because the electronic device plans the driving trajectory based on the integrated and predicted future trajectories.

What is claimed is:

1. An operating method of an electronic device, comprising:
    at least one of a sensor module or a camera module; and
    a processor coupled to at least one of the sensor module or the camera module and configured to collect information on surrounding situations through at least one of the sensor module or the camera module,
    wherein the processor is configured to:
        recognize historical trajectories of one or more surrounding objects, wherein the recognizing of the historical trajectories comprises:
            configuring a moving coordinate system based on a constant velocity model using state information on the electronic device;
            representing relative positions of the surrounding objects on the moving coordinate system,
        predict future trajectories of the surrounding objects in an integrated way based on the recognized historical trajectories,
        wherein predicting future trajectories of the surrounding objects in an integrated way includes:
            estimating the interactions based on characteristics of the interactions;
            configuring a graph model based on the recognized historical trajectories;
            predicting the future trajectories based on the graph model; and wherein:
                the graph model comprises a plurality of nodes and a plurality of edges connecting the nodes;
                the nodes indicate the surrounding objects and the electronic device, respectively;
                the edges indicate interactions among the surrounding objects and between the electronic device and each of the surrounding objects, and directionality of the interactions, respectively;
                the first edges connecting the nodes indicating the surrounding objects contains bi-directionality;
            the edges connecting any one of the nodes indicating the surrounding object and a node indicating the electronic device contains uni-directionality directed from the electronic device to the surrounding object;
            relatively evaluating two nodes, connected by an edge, based on state information on the electronic device and state information on each of the surrounding objects and assigning importance to each of the nodes, wherein the two nodes are the electronic device and one of the surrounding objects, or two of the surrounding objects;
            configuring a graph convolution neural network using an adjacency matrix to which the importance has been considered;
            predicting the future trajectories from the graph convolution neural network based on a long short-term memory network (LSTM); wherein the predicting of the future trajectories comprises predicting the future trajectories on the moving coordinate system;
        assigning importance to each of the surrounding objects using a scalable attention mechanism, wherein assigning importance to each of the surrounding objects using a scalable attention mechanism includes:
            evaluating two nodes connected by each edge in the graph model based on state information on the electronic device and the surrounding objects;
            assigning importance to each of the nodes based on the results of the evaluation; and
            computing an adjacency matrix based on the importance of each of the surrounding objects; and
        plan a driving trajectory of the electronic device based on the predicted future trajectories of the surrounding objects; and
    an output module, wherein the output module includes at least one of:
        a display module, and
        an audio module.

2. The operating method of claim 1, wherein the recognizing of the historical trajectories comprises:
    recognizing the historical trajectories based on one or more time-serial positions.

3. The operating method of claim 1, wherein the predicting of the future trajectories comprises predicting the future trajectories on the moving coordinate system.

4. The operating method of claim 1, further comprising controlling the electronic device based on the planned driving trajectory.

5. The operating method of claim 1, wherein the electronic device is an autonomous vehicle, and wherein the surrounding objects are vehicles around the electronic device.

6. The operating method of claim 1, wherein the characteristics of the interactions include multiple simultaneous interactions.

7. The operating method of claim 1, wherein the characteristics of the interactions include diffusivity, wherein diffusivity includes interactions between any two of the surrounding objects may be diffused to affect all of the electronic device and the surrounding objects.

8. The operating method of claim 1, wherein the characteristics of the interactions include time variability, wherein time variability includes changes in the interactions over time.

9. The operating method of claim 1, wherein the nodes include at least one of:
   position of the electronic device;
   speed of the electronic device;
   heading angle of the electronic device;
   position of one of the surrounding objects;
   speed of one of the surrounding objects; and
   heading angle of one of the surrounding objects.

10. The operating method of claim 1, wherein the edges connecting the nodes represent at least one of:
    a relative location; and
    a relative speed.

11. The operating method of claim 1, wherein the electronic device is connected to a vehicle,
    wherein the electronic device is connected to at least one of:
       the engine of the vehicle,
       the accelerator of the vehicle,
       the braking system of the vehicle,
       the steering of the vehicle, and
       the navigation system of the vehicle, and
    wherein the surrounding objects are vehicles around the electronic device.

12. The operating method of claim 1 wherein the electronic device further comprises:
    a communication module, wherein the communication module includes at least one of:
       a wireless communication module, or
       a wired communication module,
    an input module, wherein the input module includes at least one of:
       a microphone,
       a mouse,
       a keyboard,
       touch circuitry configured to detect a touch, and
       sensor circuitry configured to measure the intensity of a force generated by a touch, and
    an output module, wherein the output module includes at least one of:
       a display module, and
       an audio module.

13. The operating method of claim 1, wherein the sensor module of the electronic device includes at least one of:
    an acceleration sensor,
    a gyroscope sensor,
    an image sensor,
    a RADAR sensor,
    a LiDAR sensor, and
    an ultrasonic sensor.

* * * * *